United States Patent
Hu (10) Patent No.: US 8,971,794 B2
(45) Date of Patent: *Mar. 3, 2015

(54) RELAY AND HIERARCHICAL TRANSMISSION SCHEME

(71) Applicant: Empire Technology Development LLC, Wilmington, DE (US)

(72) Inventor: Fanglong Hu, Beijing (CN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,199

(22) Filed: Jan. 21, 2014

(65) Prior Publication Data
US 2014/0133389 A1    May 15, 2014

Related U.S. Application Data

(63) Continuation of application No. 13/576,929, filed as application No. PCT/CN2011/073636 on May 4, 2011, now Pat. No. 8,666,310.

(51) Int. Cl.
*H04B 3/36* (2006.01)
*H04B 7/14* (2006.01)
(Continued)

(52) U.S. Cl.
CPC ....... *H04B 7/15* (2013.01); *H04L 1/007* (2013.01); *H04N 21/234327* (2013.01);
(Continued)

(58) Field of Classification Search
USPC .......... 455/7, 509, 63.1, 15; 370/329; 375/130
See application file for complete search history.

(56) References Cited

U.S. PATENT DOCUMENTS

| 6,356,568 B1 * | 3/2002 | Nakatsugawa ................. 370/522 |
| 6,940,827 B2 | 9/2005 | Li et al. |

(Continued)

FOREIGN PATENT DOCUMENTS

| CN | 201167324 Y | 12/2008 |
| EP | 2182662 A1 | 5/2010 |

(Continued)

OTHER PUBLICATIONS

International Search Report dated Feb. 9, 2012 as received in application No. PCT/CN2011/073636.

(Continued)

*Primary Examiner* — Bobbak Safaipour
(74) *Attorney, Agent, or Firm* — Maschoff Brennan (57) ABSTRACT

In some examples, a method of transmitting data in a radio communication system is described. The method can include dividing data intended for a communication receive node into a high priority code stream and a low priority code stream. The method can also include transmitting the high priority code stream to the communication receive node and a relay node. The method can also include transmitting the low priority code stream to the communication receive node. The relay node may be configured to receive, amplify and forward the high priority code stream to the communication receive node. The communication receive node may be configured to receive the high priority code stream substantially during first time intervals and may be further configured to receive both the low priority code stream and the amplified high priority code stream substantially during second time intervals interleaved with the first time intervals.

20 Claims, 4 Drawing Sheets

(51) Int. Cl.
*H04B 7/15* (2006.01)
*H04L 1/00* (2006.01)
*H04N 21/2343* (2011.01)
*H04N 21/414* (2011.01)
*H04N 21/61* (2011.01)
*H04N 21/63* (2011.01)
*H04N 21/6377* (2011.01)
*H04B 7/155* (2006.01)
*H04L 5/00* (2006.01)
*H04N 21/438* (2011.01)

(52) U.S. Cl.
CPC .... *H04N 21/41407* (2013.01); *H04N 21/6131* (2013.01); *H04N 21/631* (2013.01); *H04N 21/6377* (2013.01); *H04B 7/155* (2013.01); *H04L 5/0023* (2013.01); *H04L 2001/0097* (2013.01); *H04N 21/4382* (2013.01); *H04L 2001/0098* (2013.01)
USPC ............... 455/7; 455/509; 455/63.1; 455/15; 370/329; 375/130

(56) References Cited

U.S. PATENT DOCUMENTS

| | | | |
|---|---|---|---|
| 8,072,943 | B2 | 12/2011 | Khan et al. |
| 8,666,310 | B2 * | 3/2014 | Hu ..................................... 455/7 |
| 8,718,694 | B2 * | 5/2014 | Wang et al. ................... 455/522 |
| 2006/0023900 | A1 * | 2/2006 | Erhart et al. ................... 381/119 |
| 2007/0070954 | A1 | 3/2007 | Kim et al. |
| 2009/0021520 | A1 * | 1/2009 | Wang ........................... 345/554 |
| 2009/0047958 | A1 * | 2/2009 | Rimhagen et al. ............. 455/436 |
| 2009/0233544 | A1 | 9/2009 | Oyman et al. |
| 2009/0252494 | A1 | 10/2009 | Capurso et al. |
| 2010/0056197 | A1 | 3/2010 | Attar et al. |
| 2010/0120360 | A1 | 5/2010 | Haustein et al. |
| 2010/0331030 | A1 | 12/2010 | Nory et al. |
| 2011/0068951 | A1 * | 3/2011 | Schwartz et al. ............. 340/906 |
| 2011/0096745 | A1 | 4/2011 | Ahn et al. |
| 2011/0102447 | A1 * | 5/2011 | Lin ............................... 345/570 |
| 2012/0263037 | A1 * | 10/2012 | Li et al. ......................... 370/230 |

FOREIGN PATENT DOCUMENTS

| | | |
|---|---|---|
| JP | 2008-271558 A | 11/2008 |
| JP | 2009-147609 A | 7/2009 |
| JP | 2010-508694 A | 3/2010 |
| WO | 02/73831 A1 | 9/2002 |
| WO | 2007/051488 A1 | 5/2007 |
| WO | 2010/025270 A1 | 3/2010 |
| WO | 2010/050704 A2 | 5/2010 |
| WO | 2010098725 A1 | 9/2010 |

OTHER PUBLICATIONS

Written Opinion of the International Searching Authority dated Feb. 9, 2012 as received in International Application No. PCT/CN2011/073636.

Agustin, "Relay-assisted Transmission and Radio Resource Management for Wireless Networks", 2008, pp. 1-11.

Wijting, et al., "Winner II System Concept: Advanced Radio Technologies for Future Wireless Systems",Proceedings from the ICT-Mobile Summit Stockholm, IIMC International Information Management Corporation, 2008, pp. 10.

"Mobile Multimedia Broadcasting. Part 1: Framing Structure, Channel Coding and Modulation for Broadcasting Channel," GY/T 220.1-2006 Standard, Oct. 24, 2006, 264 pgs.

European Search Report dated Oct. 21, 2014 as received in Application No. 11864698.3, 5 pgs.

Nabar, Rohit U. et al., "Fading Relay Channels: Performance Limits and Space-Time Signal Design", IEEE Journal on Selected Areas in Communications, vol. 22, No. 6, Aug. 1, 2004, pp. 1099-1109.

3GPP TSG-RAN1 #56, Relaying with Channel Resource Reuse and SIC for LTE-Advanced, Feb. 9-13, 2009, Athens, Greece.

* cited by examiner

RELAY AND HIERARCHICAL TRANSMISSION SCHEME

CROSS-REFERENCE TO RELATED APPLICATIONS

This patent application is a continuation of U.S. patent application Ser. No. 13/576,929, filed Aug. 2, 2012, which is the U.S. national stage of International Application No. PCT/CN2011/073636, filed May 4, 2011. The foregoing applications are incorporated herein by reference.

BACKGROUND

Unless otherwise indicated herein, the materials described herein are not prior art to the claims in the present application and are not admitted to be prior art by inclusion in this section.

At present, radio communication systems are often configured with multiple base stations and adopt a high coverage broadcast transmission mode, where each base station independently transmits to user equipment within its proximity. In other words, data transmission typically occurs over a single link from the base station to the user equipment. Due to the wide-spread use of single link transmission, the data transmission process is subject to fading, which may result in mistakes and increase incidence of user outage. For instance, for user equipment near cell edges, large losses during transmission can significantly impair reception performance of the user equipment.

SUMMARY

Techniques described herein generally relate to the hierarchical transmission of data in radio communication systems that include one or more relay nodes.

In some examples, a method of transmitting data in a radio communication system is described. The method can include dividing data intended for a communication receive node into a high priority code stream and a low priority code stream. The method can also include transmitting the high priority code stream to the communication receive node and a relay node. The method can also include transmitting the low priority code stream to the communication receive node. The relay node may be configured to receive, amplify and forward the high priority code stream to the communication receive node. The communication receive node may be configured to receive the high priority code stream substantially during first time intervals and may be further configured to receive both the low priority code stream and the amplified high priority code stream substantially during second time intervals interleaved with the first time intervals.

In some examples, a computer-readable storage medium having computer-executable instructions stored thereon that are executable by a computing device to perform operations is described. The operations can include dividing data intended for a communication receive node into a high priority code stream and a low priority code stream. The operations can also include transmitting the high priority code stream to the communication receive node and a relay node. The operations can also include transmitting the low priority code stream to the communication receive node. The relay node may be configured to receive, amplify and forward the high priority code stream to the communication receive node. The communication receive node may be configured to receive the high priority code stream substantially during first time intervals and may be further configured to receive both the low priority code stream and the amplified high priority code stream substantially during second time intervals interleaved with the first time intervals.

In some examples, a method of receiving data in a radio communication system is described. The method can include receiving, substantially during first time intervals, a high priority code stream from a communication transmit node. The method can also include receiving, substantially during second time intervals, a low priority code stream from the communication transmit node. The method can also include receiving, substantially during the second time intervals, an amplified high priority code stream from a relay node.

In some examples, a computer-readable storage medium having computer-executable instructions stored thereon that are executable by a computing device to perform operations is described. The operations can include receiving, substantially during first time intervals, a high priority code stream from a communication transmit node. The operations can also include receiving, substantially during second time intervals, a low priority code stream from the communication transmit node. The operations can also include receiving, substantially during the second time intervals, an amplified high priority code stream from a relay node.

In some examples, a radio communication system is described that can include a communication transmit node, a relay node, and a communication receive node. The communication transmit node can be configured to divide data into a high priority code stream and a low priority code stream and to transmit the high priority and low priority code streams. The relay node can be configured to receive, amplify and forward the high priority code stream. The communication receive node can be configured to receive the high priority code stream from the communication transmit node substantially during first time intervals, to receive the low priority code stream from the communication transmit node substantially during second time intervals, and to receive the amplified high priority code stream from the relay node substantially during the second time intervals.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Some embodiments disclosed herein generally relate to techniques for hierarchically transmitting data in a radio communication system that includes one or more relay nodes. Generally, for example, data intended for a communication receive node, such as a mobile phone, smart phone, or laptop computer, may be divided into a high priority code stream and a low priority code stream by a communication transmit node, such as a base station or an evolved Node B (eNB). Both code streams may be transmitted to the communication receive node such that data from the high priority code stream is transmitted during first time intervals and data from the low priority code stream is transmitted during second time intervals interleaved with the first time intervals.

The high priority code stream may be received by both the communication receive node and a relay node during the first time intervals. The relay node may be synchronized with the communication transmit node and may be configured to amplify and forward the high priority code stream to the communication receive node during the second time intervals. Thus, during the second time intervals, the communication receive node may receive both the low priority code stream from the communication transmit node and the amplified high priority code stream from the relay node.

The high priority code stream may be configured to ensure basic communication service for the communication receive node. The low priority code stream may be configured to enhance communication service for the communication receive node. Receiving the high priority code stream during the first time intervals and the amplified high priority code stream during the second time intervals provides time diversity for data included in the high priority code stream, which may improve performance in the radio communication system. Accordingly, in the event the communication receive node receives only the high priority code stream and/or the amplified high priority code stream, the communication receive node may still have basic communication service in the radio communication system. In the event the communication receive node additionally receives the low priority code stream, the communication service to the communication receive node may be improved, thereby improving a user experience of a user associated with the communication receive node.

The techniques described herein may be used for various radio communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM (R), etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

Figure 1:
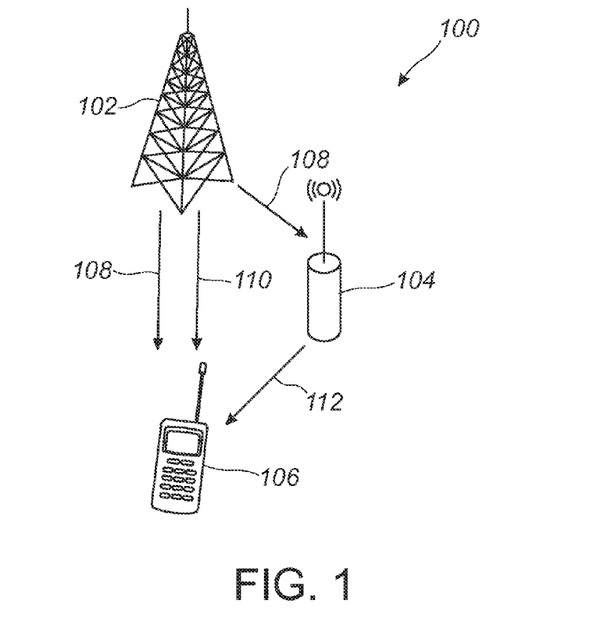
FIG. 1 is a diagram of a radio communication system including a communication transmit node, a relay node, and a communication receive node.

FIG. 1 is a diagram of a radio communication system 100 including a communication transmit node 102, a relay node 104, and a communication receive node 106, arranged in accordance with at least some embodiments described herein. In the illustrated embodiment, the radio communication system 100 is implemented as a single "cell" serviced by the communication transmit node 102. More generally, the radio communication system 100 may include a multiple number of cells, each of which may be serviced by a corresponding communication transmit node 102. In these and other embodiments, the communication transmit node 102 may be implemented as, e.g., a base station, an eNB, or the like.

In some embodiments, the communication transmit node 102 may be configured to divide data intended for the communication receive node 106 into two code streams, including a high priority code stream 108 and a low priority code stream 110. The data intended for the communication receive node 106 may include, e.g., video data, voice data, or other data. In general, the data in the high priority code stream 108 may be configured to facilitate successful access of the radio communication system 100 and basic communication with the radio communication system 100 by the communication receive node 106, while data in the low priority code stream 110 may be configured to provide enhanced communication with the radio communication system 100.

Although not required, in some embodiments, the low priority code stream 110 has a lower data flow rate than the high priority code stream 108. For instance, over time, about $^{11}/_{16}$ of the data intended for the communication receive node 106 may be transmitted through the high priority code stream 108, while about $^{5}/_{16}$ of the data intended for the communication receive node 106 may be transmitted through the low priority code stream 108.

Optionally, the data intended for the communication receive node 106 may include video data coded using a layered video coding scheme such that the coded video data includes, e.g., a base layer and an enhancement layer. In these and other embodiments, the high priority code stream 108 may include, for instance, control information and the base layer of the coded video data. The control information may facilitate successful access of the radio communication system 100 by the communication receive node 106, while the base layer of the video data may provide basic video quality. Alternately or additionally, the low priority code stream 110 may include, for instance, the enhancement layer of the coded video data. By combining the base layer of the coded video data with the enhancement layer of the coded video data, the communication receive node 106 may provide higher quality video than would otherwise be possible using solely the base layer of the coded video data.

In some embodiments, the communication transmit node 102 may be configured to interleave, in an alternating fashion, data included in the high priority code stream 108 with data included in the low priority code stream 110 in time slots of equal or different lengths. Time slots during which data from the high priority code stream 108 is transmitted may be referred to hereinafter as "first time intervals," while time slots during which data from the low priority code stream 110 is transmitted may be referred to hereinafter as "second time intervals." A "transmission process" as used hereinafter may refer to a transmission by the communication transmit node 102 that spans a first time interval and an immediately subsequent second time interval.

In general, the relay node 104 may be configured to receive a transmission of data from an upstream station, e.g., from the communication transmit node 102, and to send a transmission of data to a downstream station, e.g., to the communication receive node 106. In these and other embodiments, the relay node 104 may alternate between a receive mode and an amplify-and-forward mode. The receive mode may be synchronized with the first time intervals and the amplify-and-forward mode may be synchronized with the second time intervals. For instance, in the receive mode, the relay node 104 may be configured to receive the high priority code stream 108 during the first time interval of each transmission process of the communication transmit node 102. Alternately or additionally, in the amplify-and-forward mode, the relay node 104 may be configured to amplify and forward the high priority code stream 108 to the communication receive node 106 during the second time interval of each transmission process. The amplified high priority code stream 108 forwarded to the communication receive node 106 by the relay node 104 during the second time interval of each transmission process is identified in FIG. 1 at 112, and is referred to hereinafter as the "amplified high priority code stream 112."

The communication receive node 106 may be referred to as a terminal, an access terminal (AT), a mobile station (MS), user equipment (UE), a subscriber unit, station, or the like. In some embodiments, the communication receive node 106 may include, but is not limited to a mobile phone, a smartphone, a laptop computer, or the like or any combination thereof.

The communication receive node 106 may communicate with the communication transmit node 102 via a downlink (e.g., high and low priority code streams 108, 110 and/or amplified high priority code stream 112) and/or an uplink (not shown). The downlink (or forward link) refers to the communication link from the communication transmit node 102 to the communication receive node 106, and the uplink (or reverse link) refers to the communication link from the communication receive node 106 to the communication transmit node 102.

The communication receive node 106 is generally configured to receive data transmitted to the communication receive node 106 by either or both of the communication transmit node 102 or the relay node 104. In some embodiments, for instance, the communication receive node 106 is configured to receive data included in the high priority code stream 108 and/or the low priority code stream 110 from the communication transmit node 102. In these and other embodiments, the communication receive node 106 may receive, substantially during the first time intervals, the high priority code stream 108 and may additionally receive, substantially during the second time intervals, the low priority code stream 110.

Alternately or additionally, the communication receive node 106 may be configured to receive data included in the amplified high priority code stream 112 from the relay node 104. In these and other embodiments, the communication receive node 106 may receive, substantially during the second time interval(s), the amplified high priority code stream 112. Thus, the communication receive node 106 may be configured to receive, substantially during the second time interval(s), the low priority code stream 110 from the communication transmit node 102 and the amplified high priority code stream 112 from the relay node 104 since both may be transmitted to the communication receive node 106 during the second time intervals according to some embodiments.

Alternately or additionally, the communication receive node 106 may be configured to separate the amplified high priority code stream 112 from the low priority code stream 110. For example, the communication receive node 106 may perform a minimum mean squared error analysis of the low priority code stream 110 and the amplified high priority code stream 112 which are both received substantially during the second time intervals to separate the amplified high priority code stream 112 from the low priority code stream 110.

Figure 2:
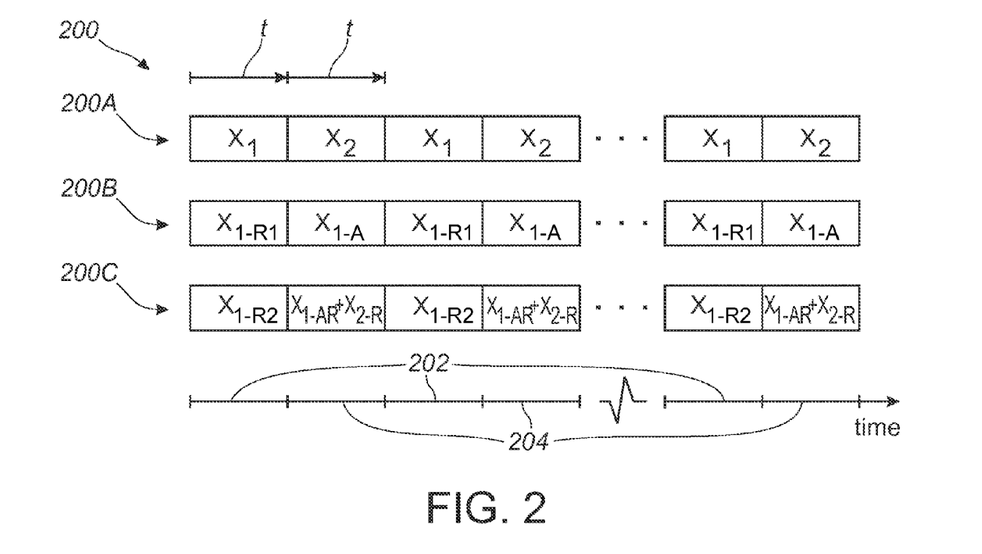
FIG. 2 is a schematic diagram of data transmitted and received in the radio communication system of FIG. 1.

FIG. 2 is a schematic diagram of data 200 transmitted and received in the radio communication system 100 of FIG. 1, arranged in accordance with at least some embodiments described herein. With combined reference to FIGS. 1-2, the data 200 may include first data 200A associated with the communication transmit node 102, second data 200B associated with the relay node 104, and third data 200C associated with the communication receive node 106.

In more detail, the first data 200A associated with the communication transmit node 102 may include high priority data $X_1$ included in the high priority code stream 108, and low priority data $X_2$ included in the low priority code stream 110. The high priority data $X_1$ may be transmitted by the communication transmit node 102 during the first time intervals and may have a duration t. The low priority data $X_2$ may be transmitted by the communication transmit node 102 during the second time intervals, and may also have a duration t. The first time intervals are identified in FIG. 2 at 202, and the second time intervals are identified in FIG. 2 at 204.

The second data 200B associated with the relay node 104 may include high priority data $X_{1-R1}$ received from the communication transmit node 102 in the high priority code stream 108 during the first time intervals 202, and amplified high priority data $X_{1-A}$ transmitted to the communication receive node 106 in the amplified high priority code stream 112 during the second time intervals 204. In some embodiments, each block of amplified high priority data $X_{1-A}$ transmitted to the communication receive node 106 in the amplified high priority code stream 112 during a second time interval 204 may include an amplified version of the corresponding block of high priority data $X_{1-R1}$ received from the communication transmit node 102 during an immediately preceding first time interval 202.

The third data 200C associated with the communication receive node 106 may include high priority data $X_{1-R2}$ received from the communication transmit node 102 in the high priority code stream 108 during the first time intervals 202. During the second time intervals 204, however, the communication receive node 106 may receive one or both of amplified high priority data $X_{1-AR}$ from the relay node 104 in the amplified high priority code stream 112 and low priority data $X_{2-R}$ from the communication transmit node 102 in the low priority code stream 110. In some embodiments, receiving, at the communication receive node 106, high priority data $X_{1-R2}$ of the high priority code stream 108 during the first time intervals 202 and amplified high priority data $X_{1-AR}$ of the amplified high priority code stream 112 during the second time intervals 204 provides time diversity with respect to the originally transmitted high priority data $X_1$, which may improve reception performance of the original transmitted high priority data $X_1$ by eliminating or minimizing error bursts, for instance.

Figure 3:
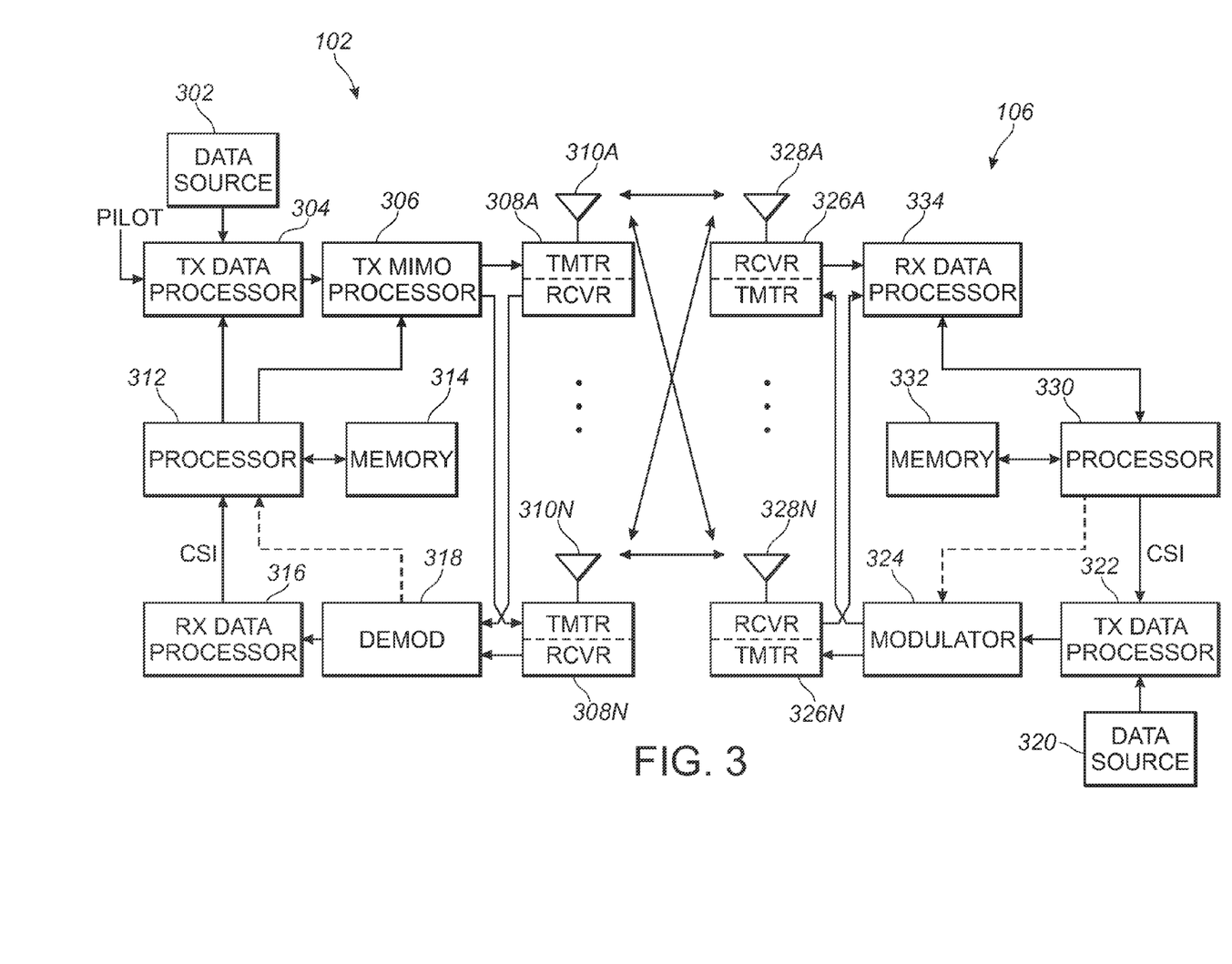
FIG. 3 is a block diagram of an example embodiment of the communication transmit node and the communication receive node of FIG. 1.

FIG. 3 is a block diagram of an example embodiment of the communication transmit node 102 and the communication receive node 106 of FIG. 1, arranged in accordance with at least some embodiments described herein.

In the illustrated embodiment, the communication transmit node 102 may include, for example, a data source 302, a transmit (TX) data processor 304, a TX multiple input multiple output (MIMO) processor 306, one or more transceivers 308A-308N, one or more antennas 310A-310N, a processor 312, a memory or other computer-readable storage medium 314, a receive (RX) data processor 316, and a demodulator 318. Each of the transceivers 308A-308N may include a transmitter (TMTR) and a receiver (RCVR).

Alternately or additionally, the communication receive node 106 may include, for example, a data source 320, a TX data processor 322, a modulator 324, one or more transceivers 326A-326N, one or more antennas 328A-328N, a processor 330, a memory or other computer-readable storage medium 332, and an RX data processor 334. Each of the transceivers 326A-326N may include a transmitter (TMTR) and a receiver (RCVR).

An example embodiment of operation of the components of the communication transmit node 102 and the communication receive node 106 that are depicted in FIG. 3 will now be described. At the communication transmit node 102, traffic data for a number of data streams may be provided from the data source 302 to the TX data processor 304. The TX data processor 304 may format, code, and interleave the traffic data for each data stream based on a particular coding scheme selected for that data stream to provide coded data.

The coded data for each data stream may be multiplexed with pilot data using OFDM techniques. The pilot data may include a known data pattern that is processed in a known manner and that may be used at a receiver system to estimate channel response. The multiplexed pilot and coded data for each data stream may then be modulated (i.e., symbol mapped) based on a particular modulation scheme (e.g., BPSK, QSPK, M-PSK, or M-QAM) selected for that data stream to provide modulation symbols.

The data rate, coding, and modulation for each data stream may be determined by the processor 312 executing computer-executable instructions stored on the memory 314. Alternately or additionally, the processor 312 may execute computer-executable instructions stored on the memory 314 or other location that are effective to cause the communication transmit node 102 to perform one or more of the operations described herein. The memory 314 may store computer-executable instructions such as program code, as well as data, and/or other information used by the processor 312 or other components of the communication transmit node 102.

The modulation symbols for all data streams may then be provided to the TX MIMO processor 306, which may further process the modulation symbols (e.g., for OFDM). The TX MIMO processor 306 may then provide modulation symbol streams to transceivers 308A-308N. In some embodiments, the TX MIMO processor 306 may apply beam-forming weights to the symbols of the data streams and/or to the antenna 310A-310N from which the symbol is being transmitted.

Each transceiver 308A-308N may receive and process a respective symbol stream to provide one or more analog signals, and may further condition (e.g., amplify, filter, and/or upconvert) the analog signals to provide a modulated signal suitable for transmission over the MIMO channel. Modulated signals from transceivers 308A-308N are then transmitted from antennas 310A-310N, respectively.

At the communication receive node 106, the transmitted modulated signals may be received by antennas 328A-328N and the received signal from each antenna 328A328N may be provided to a respective transceiver 326A-326N. Each transceiver 326A-326N may condition (e.g., filter, amplify, and downconvert) a respective received signal, digitize the conditioned signal to provide samples, and further process the samples to provide a corresponding "received" symbol stream.

The RX data processor 334 may then receive and process the received symbol streams from the transceivers 326A-326N based on a particular receiver processing technique to provide "detected" symbol streams. The RX data processor 334 may then demodulate, deinterleave, and decode each detected symbol stream to recover the traffic data for the data stream. The processing by the RX data processor 334 may be complementary to that performed by the TX MIMO processor 306 and the TX data processor 304 at the communication transmit node 102.

The processor 330 may periodically determine which precoding matrix to use. The processor 330 may formulate a reverse link message comprising a matrix index portion and a rank value portion. Alternately or additionally, the processor 330 may execute computer-executable instructions stored on the memory 332 or other location that are effective to cause the communication receive node 106 to perform one or more of the operations described herein. The memory 332 may store computer executable instructions such as program code, as well as data and/or other information used by the processor 312 or other components of the communication receive node 106.

Reverse link messages may be generated by the communication receive node 106 and may include various types of information regarding the communication link between the communication receive node 106 and the communication transmit node 102, and/or regarding the received data stream. Reverse link messages may be processed by the TX data processor 322, which may also receive traffic data for one or more data streams from the data source 320, modulated by the modulator 324, conditioned by the transceivers 326A-326N, and transmitted back to the communication transmit node 102.

At the communication transmit node 102, the modulated signals from the communication receive node 106 may be received by the antennas 310A-310N, conditioned by the transceivers 308A-308N, demodulated by the demodulator 318, and processed by the RX data processor 316 to extract reverse link messages transmitted by the communication receive node 106. The processor 312 may then determine which pre-coding matrix to use for determining the beam-forming weights and/or may then process the extracted message.

Figure 4:
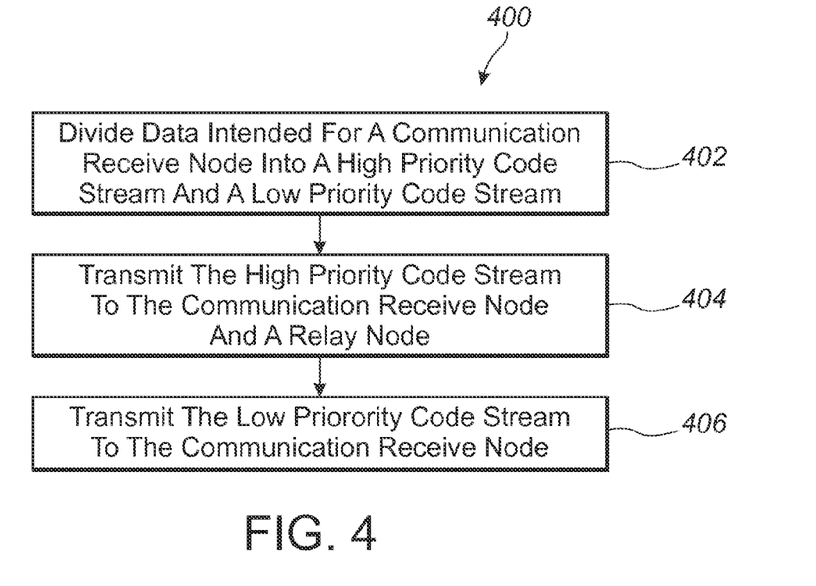
FIG. 4 shows an example flow diagram of a method of transmitting data in a radio communication system.

FIG. 4 shows an example flow diagram of a method 400 of transmitting data in a radio communication system, arranged in accordance with at least some embodiments described herein. The method 400 may be performed in whole or in part by, e.g., the communication transmit node 102 in the radio communication system 100 of FIG. 1. The method 400 includes various operations, functions or actions as illustrated by one or more of blocks 402, 404 and/or 406. The method 400 may begin at block 402.

In block 402, ["Divide Data Intended For A Communication Receive Node Into A High Priority Code Stream And A Low Priority Code Stream"], data intended for a communication receive node, such as the communication receive node 106 of FIG. 1, is divided into a high priority code stream and a low priority code stream, such as the high and low priority code streams 108, 110 of FIG. 1. The data may be divided between the high priority code stream and low priority code stream based on a relative importance of the data. For example, video data coded using a layered video coding scheme may include a base layer and an enhancement layer. The base layer may be considered to be relatively more important than the enhancement layer in some embodiments, and thus the base layer may be included in the high priority code stream while the enhancement layer may be included in the low priority code stream.

Data included in the high priority code stream and the low priority code stream may be coded. In these and other embodiments, the coding of the data in the high priority code stream and the low priority code stream may be the same or it may be different. Alternately or additionally, the high priority code stream may be configured to ensure basic communication service for the communication receive node, while the low priority code stream may be configured to enhance communication service for the communication receive node. Block 402 may be followed by block 404.

In block 404, ["Transmit The High Priority Code Stream To The Communication Receive Node And A Relay Node"], the high priority code stream may be transmitted to the communication receive node and a relay node. In these and other embodiments, the relay node may be configured to receive, amplify and forward the high priority code stream to the communication receive node. Alternately or additionally, the communication receive node may be configured to receive the high priority code stream substantially during first time intervals and may be further configured to receive both the low priority code stream and the amplified high priority code stream substantially during second time intervals interleaved with the first time intervals. Alternately or additionally, transmitting the high priority code stream to the communication receive node and a relay node may include transmitting data included in the high priority code stream during the first time intervals. Block 404 may be followed by block 406.

In block 406, ["Transmit The Low Priority Code Stream To The Communication Receive Node"], the low priority code stream may be transmitted to the communication receive node. Transmitting the low priority code stream to the communication receive node may include transmitting data included in the low priority code stream during the second time intervals.

Some embodiments disclosed herein include a computer-readable storage medium having computer-executable instructions stored thereon that are executable by a computing device to perform operations included in the method 400 of FIG. 4, such as the operations illustrated by blocks 402, 404, and/or 406 in FIG. 4. In these and other embodiments, the computing device may be included in the communication transmit node. For instance, the computing device may include the processor 312 included in the communication transmit node 102 of FIG. 3. Alternately or additionally, the computer-readable storage medium may include the memory 314 included in the communication transmit node 102 of FIG. 3.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For example, block 406 in which the low priority code stream is transmitted to the communication receive node may be omitted to reduce data traffic in the radio communication system. Reducing data traffic may be desirable during periods of heavy demand for system resources in the radio communication system, during periods of reduced resource availability, and/or at other times. In these and other embodiments, the high priority code stream transmitted to the communication receive node and forwarded by the relay node to the communication receive node can ensure basic communication service for the communication receive node, while demand for system resources may be reduced by not transmitting the low priority code stream.

Figure 5:
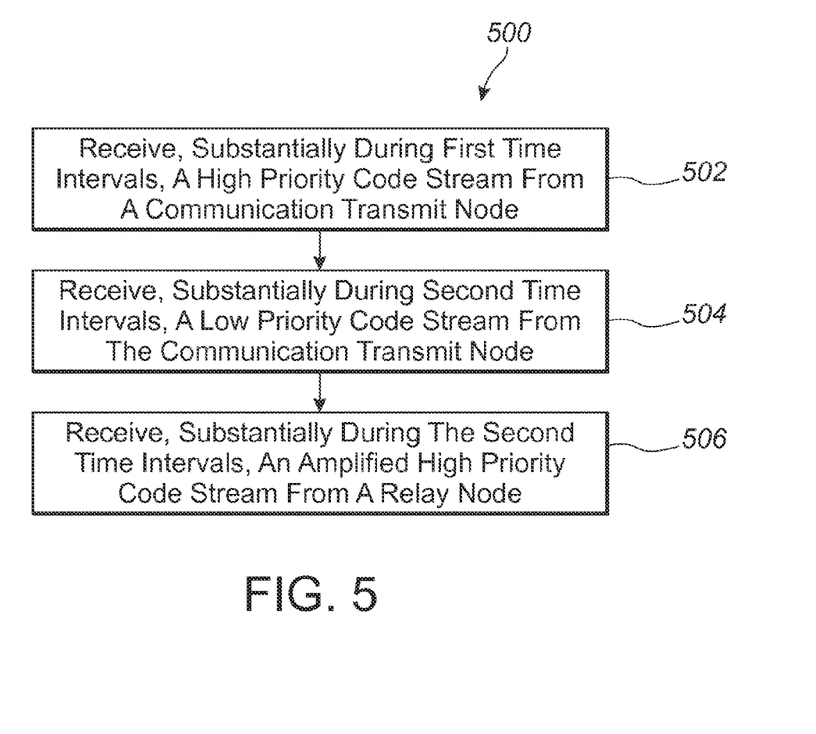
FIG. 5 shows an example flow diagram of a method of receiving data in a radio communication system.

FIG. 5 shows an example flow diagram of a method 500 of receiving data in a radio communication system, arranged in accordance with at least some embodiments described herein. The method 500 may be performed in whole or in part by, e.g., the communication receive node 106 in the radio communication system 100 of FIG. 1. The method 500 includes various operations, functions or actions as illustrated by one or more of blocks 502, 504, 506. The method 500 may begin at block 502.

In block 502, ["Receive, Substantially During First Time Intervals, A High Priority Code Stream From A Communication Transmit Node"], a high priority code stream from a communication transmit node is received substantially during first time intervals. The first time intervals may correspond to the first time intervals 202 of FIG. 2, for instance. The high priority code stream may be configured to ensure basic communication service for a communication receive node that receives the high priority code stream. Block 502 may be followed by block 504.

In block 504, ["Receive, Substantially During Second Time Intervals, A Low Priority Code Stream From The Communication Transmit Node"], a low priority code stream from the communication transmit node may be received substantially during second time intervals. The second time intervals may correspond to the second time intervals 204 of FIG. 2, for instance. The low priority code stream may be configured to enhance communication service for the communication receive node relative to reception quality when only the high priority code stream is received. Block 504 may be followed by block 506.

In block 506, ["Receive, Substantially During The Second Time Intervals, An Amplified High Priority Code Stream From A Relay Node"], an amplified high priority code stream from a relay node may be received substantially during the second time intervals. In some embodiments, receiving both the high priority code stream during the first time intervals and an amplified high priority code stream during the second time intervals provides time diversity for data included in the high priority code stream. The communication receive node may take advantage of the time diversity to minimize or reduce error bursts, for instance, and thereby improve reception performance.

The method 500 may be modified to include more or fewer steps than illustrated in FIG. 5. For example, block 504 in which the low priority code stream is received from the communication transmit node may be omitted if, for instance, the communication transmit node does not transmit the low priority code stream or if the communication receive node is otherwise unable to receive the low priority code stream. As described above with respect to FIG. 4, the communication transmit node may determine not to transmit the low priority code stream during periods of heavy demand for system resources, during periods of reduced resource availability, or the like. In these and other embodiments, the high priority code stream received from the communication transmit node and the amplified high priority code stream received from the relay node may ensure basic communication service for the communication receive node even in the absence of the low priority code stream.

As another example, the method 500 may further include separating the amplified high priority code stream from the low priority code stream. Separating the amplified high priority code stream from the low priority code stream may include performing a minimum means squared error analysis of the received low priority code stream and the amplified high priority code stream.

As yet another example, the method 500 may further include combining the low priority code stream and the high priority code stream together for improved service quality. The low priority code stream and the high priority code stream may be combined using a particular decoder, such as a layered video decoder in embodiments where the data in the high priority code stream and low priority code stream includes video data.

Some embodiments disclosed herein include a computer-readable storage medium having computer-executable instructions stored thereon that are executable by a computing device to perform operations included in the method 500 of FIG. 5, such as the operations illustrated by blocks 502, 504, and/or 506 in FIG. 5. In these and other embodiments, the computing device may be included in the communication receive node. For instance, the computing device may include the processor 330 included in the communication receive node 106 of FIG. 3. Alternately or additionally, the computer-readable storage medium may include the memory 332 included in the communication receive node 106 of FIG. 3.

Figure 6:
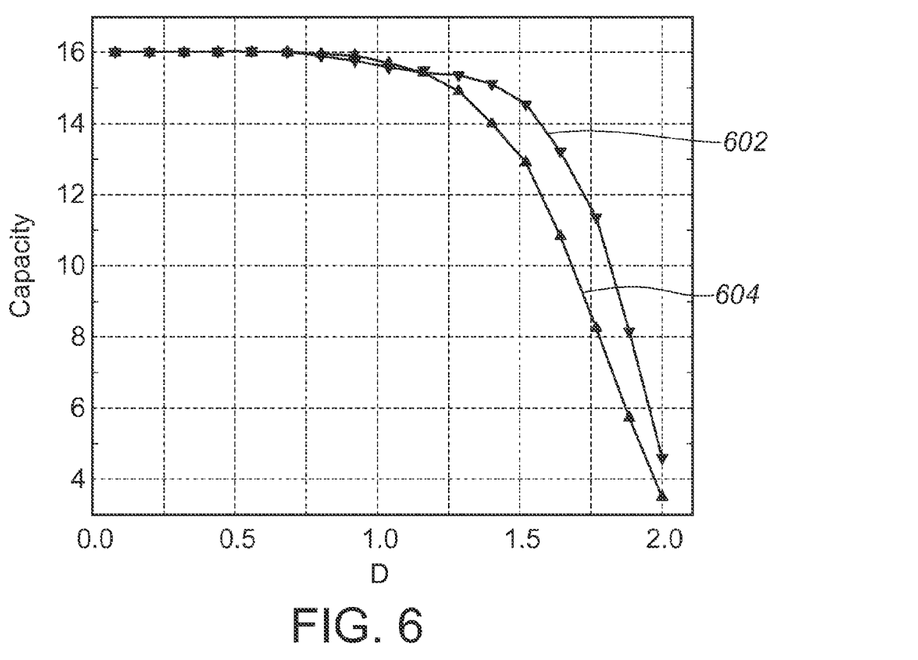
FIG. 6 is a graph comparing capacity between various radio communication systems.

FIG. 6 is a graph comparing capacity between various radio communication systems, arranged in accordance with at least some embodiments described herein. FIG. 6 includes a first curve 602 and a second curve 604. The first curve 602 may represent simulated capacity as a function of distance D (in kilometers (km)) in a first radio communication system. The first radio communication system may generally be configured as illustrated in FIG. 1, and may include a communication transmit node, a relay node, and a communication receive node, all generally configured as described hereinabove. The distance D may refer to the distance from the communication transmit node to the communication receive node. Table 1 below presents various simulation parameters used in the simulation of the first curve 602.

TABLE 1

| System Bandwidth | 8 MHz |
|---|---|
| Frequency Point | 740 MHz |
| Cell Radius | r = 2 km |
| Distance Between Communication Transmit Node And Relay Node | 0.5*r = 1 km |
| Path Loss Model | PL = 15 + 30logD (D in km) |
| Communication Transmit Node Transmit Power | 35 dBm |
| Relay Node Transmit Power | 20 dBm |
| Interference Power | 5 dBm |
| Signal to Noise Ratio | 18 dB |
| Communication Transmit Node-Relay Node Link Signal To Noise Ratio | 4096 |
| Number of Subcarriers | 3076 |
| Channel    Communication | Chinese 6 |

TABLE 1-continued

| Type | Transmit Node-Communication Receive Node, Relay Node-Communication Receive Node Communication Transmit Node-Relay Node | Single-Path Rayleigh Channel |
|---|---|---|

The second curve 604 may represent simulated capacity as a function of the distance D in a second radio communication system. The second radio communication system may include a communication transmit node and a communication receive node without a relay node. Additionally, the second radio communication system may implement a standard high coverage broadcast mode often employed in radio communication systems in the absence of relay nodes.

As seen in FIG. 6 by comparing the first and second curves 602, 604, the capacity of the first and second radio communication systems is substantially the same from D=0 km to about D=1.15 km. However, from about D=1.15 km to about D=2 km, the capacity of the first radio communication system including a relay node and generally configured as disclosed herein is significantly improved compared to the capacity of the second radio communication system lacking a relay node.

Figure 7:
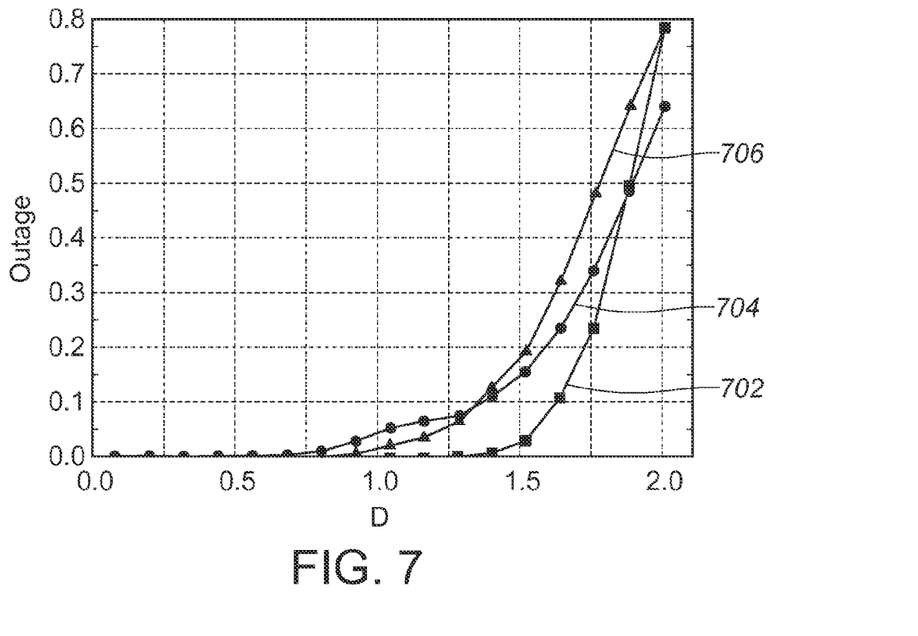
FIG. 7 is a graph comparing incidence of outage between various radio communication systems, all arranged in accordance with at least some embodiments described herein.

FIG. 7 is a graph comparing incidence of outage between various radio communication systems, arranged in accordance with at least some embodiments. FIG. 7 includes a first curve 702, a second curve 704, and a third curve 706. The first curve 702 may represent simulated outage as a function of distance D (in km) for a high priority code stream in the first radio communication system described with respect to FIG. 6. The second curve 704 may represent simulated outage as a function of distance D for a low priority code stream in the first radio communication system. The third curve 706 may represent simulated outage as a function of distance D for a standard transmission stream in the second radio communication system described with respect to FIG. 6.

As seen in FIG. 7 by comparing the first, second and third curves 702, 704, 706, the outage of the high priority code stream (first curve 702) is significantly less than the outage of the standard transmission stream (third curve 706) from about 1 km to about 2 km. Additionally, the outage of the low priority code stream (second curve 704) is significantly less than the outage of the standard transmission stream from about 1.25 km to about 2 km.

It can be seen from FIGS. 6 and 7 that some embodiments described herein may improve radio communication system performance, such as by improving system capacity or by decreasing incidence of user outage, or by otherwise improving performance. Alternately or additionally, some embodiments described herein may be implemented in existing radio communication systems by adding low-cost relay nodes to the radio communication system and implementing a hierarchical transmission scheme. Accordingly, some embodiments described herein may permit operators of radio communication systems to efficiently and flexibly expand coverage of radio systems and to raise user experience with respect to the systems to thereby enlarge customer scale and increase business profits.

The present disclosure is not to be limited in terms of the particular embodiments described herein, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub ranges and combinations of sub ranges thereof ny listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of transmitting data in a radio communication system, the method comprising:
   dividing data intended for a communication receive node into a high priority code stream and a low priority code stream; and
   in response to demand for system resources in the radio communication system exceeding a threshold during a first period of demand, transmitting the high priority code stream to the communication receive node and a relay node without transmitting the low priority code stream to the communication receive node;
   wherein:
      the relay node is configured to receive, amplify and forward the high priority code stream to the communication receive node; and
      the communication receive node is configured to receive the high priority code stream substantially during first time intervals and is further configured to receive the amplified high priority code stream substantially during second time intervals interleaved with the first time intervals.

2. The method of claim 1, wherein the data is divided into the high priority and low priority code streams by a communication transmit node.

3. The method of claim 1, wherein the high priority code stream is configured to ensure basic communication service for the communication receive node.

4. The method of claim 3, wherein the low priority code stream is configured to enhance communication service for the communication receive node, the method further comprising, in response to demand for the system resources in the radio communication system being less than the threshold during a second period of demand, transmitting the low priority code stream to the communication receive node during the second time intervals.

5. The method of claim 1, wherein transmitting the high priority code stream to the communication receive node and the relay node includes transmitting data included in the high priority code stream during the first time intervals.

6. A non-transitory computer-readable storage medium having computer-executable instructions stored thereon that are executable by a computing device to perform operations comprising:
   dividing data intended for a communication receive node into a high priority code stream and a low priority code stream; and
   in response to demand for system resources in a radio communication system exceeding a threshold during a first period of demand, transmitting the high priority code stream to the communication receive node and a relay node without transmitting the low priority code stream to the communication receive node;
   wherein:
      the relay node is configured to amplify and forward the high priority code stream to the communication receive node; and
      the communication receive node is configured to receive the high priority code stream substantially during first time intervals and is further configured to receive the amplified high priority code stream substantially during second time intervals interleaved with the first time intervals.

7. The non-transitory computer-readable storage medium of claim 6, wherein the computing device is included in a communication transmit node.

8. The non-transitory computer-readable storage medium of claim 7, wherein the communication transmit node comprises a base station or an evolved Node B.

9. The non-transitory computer-readable storage medium of claim 6, wherein the high priority code stream is configured to ensure basic communication service for the communication receive node.

10. The non-transitory computer-readable storage medium of claim 6, wherein the low priority code stream is configured to enhance communication service for the communication receive node, the operations further comprising, in response to demand for the system resources in the radio communication system being less than the threshold during a second period of demand, transmitting the low priority code stream to the communication receive node during the second time intervals.

11. The non-transitory computer-readable storage medium of claim 6, wherein transmitting the high priority code stream to the communication receive node and the relay node includes transmitting data included in the high priority code stream during the first time intervals.

12. A method of receiving data in a radio communication system, the method comprising:
   receiving, substantially during first time intervals, a high priority code stream from a communication transmit node, wherein the high priority code stream together with a low priority code stream form data intended for a communication receive node; and
   during a first period of demand for system resources in the radio communication system, receiving, substantially during second time intervals, an amplified high priority code stream from a relay node without receiving the low priority code stream from the communication transmit node, wherein the second time intervals are interleaved with the first time intervals.

13. The method of claim 12, further comprising, during a second period of demand for system resources that occurs before or after the first period of demand:
   receiving, substantially during the second time intervals, the low priority code stream from the communication transmit node and the amplified high priority code stream from the relay node; and
   separating the amplified high priority code stream from the low priority code stream, wherein demand for system resources is lower during the second period of demand than during the first period of demand.

14. The method of claim 13, wherein separating the amplified high priority code stream from the low priority code stream includes performing a minimum mean squared error analysis of the received low priority code stream and the amplified high priority code stream.

15. The method of claim 12, wherein receiving the high priority code stream substantially during the first time intervals and an amplified high priority code stream substantially during the second time intervals provides time diversity for data included in the high priority code stream.

16. A non-transitory computer-readable storage medium having computer-executable instructions stored thereon that are executable by a computing device to perform operations comprising:
   receiving, substantially during first time intervals, a high priority code stream from a communication transmit node in a radio communication system, wherein the high priority code stream together with a low priority code stream form data intended for a communication receive node; and
   during a first period of demand for system resources in the radio communication system, receiving, substantially during second time intervals, an amplified high priority code stream from a relay node without receiving the low priority code stream from the communication transmit node, wherein the second time intervals are interleaved with the first time intervals.

17. The non-transitory computer-readable storage medium of claim 16, wherein the computing device is included in the communication receive node.

18. The non-transitory computer-readable storage medium of claim 17, wherein the communication receive node comprises a mobile phone, a smartphone, or a laptop computer.

19. The non-transitory computer-readable storage medium of claim 16, wherein the operations further comprise, during a second period of demand for system resources that occurs before or after the first period of demand:
   receiving, substantially during the second time intervals, the low priority code stream from the communication transmit node and the amplified high priority code stream from the relay node; and
   separating the amplified high priority code stream from the low priority code stream, wherein demand for system resources is lower during the second period of demand than during the first period of demand.

20. The non-transitory computer-readable storage medium of claim 19, wherein separating the amplified high priority code stream from the low priority code stream includes performing a minimum mean squared error analysis of the received low priority code stream and amplified high priority code stream.

* * * * *